(12) United States Patent
Oyman

(10) Patent No.: US 10,873,579 B2
(45) Date of Patent: Dec. 22, 2020

(54) DASH-AWARE NETWORK APPLICATION FUNCTION (D-NAF)

(71) Applicant: Apple Inc., Cupertino, CA (US)

(72) Inventor: Ozgur Oyman, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/808,748

(22) Filed: Nov. 9, 2017

(65) Prior Publication Data

US 2018/0069856 A1    Mar. 8, 2018

Related U.S. Application Data

(63) Continuation of application No. 14/653,779, filed as application No. PCT/US2013/077497 on Dec. 23, 2013, now Pat. No. 9,906,526.

(Continued)

(51) Int. Cl.
*H04L 29/06*    (2006.01)
*H04L 29/08*    (2006.01)
(Continued)

(52) U.S. Cl.
CPC .......... *H04L 63/0869* (2013.01); *H04L 9/321* (2013.01); *H04L 9/3247* (2013.01); *H04L 63/08* (2013.01); *H04L 63/0823* (2013.01); *H04L 63/12* (2013.01); *H04L 63/168* (2013.01); *H04L 65/105* (2013.01); *H04L 65/4076* (2013.01);
(Continued)

(58) Field of Classification Search
CPC ... H04L 63/0869; H04L 9/321; H04L 9/3247; H04L 63/08; H04L 63/0823; H04L 63/12; H04L 63/168; H04L 65/105
See application file for complete search history.

(56) References Cited

U.S. PATENT DOCUMENTS 7,340,526 B2 *   3/2008   Kime ................ H04L 29/06027
                                                                709/227
7,640,574 B1 *  12/2009   Kim ......................... G06F 21/31
                                                                  726/1
(Continued)

FOREIGN PATENT DOCUMENTS

CN      101112038 A     1/2008
EP       1705828 A1     9/2006
(Continued)

OTHER PUBLICATIONS

Search Query Report from IP.com (performed Jun. 4, 2020).*
(Continued)

*Primary Examiner* — Sharon S Lynch

(57) ABSTRACT

Technology for a network application function (NAF) on a network element is disclosed. The NAF can authenticate a client using a Generic Bootstrapping Architecture (GBA)-based authentication and authorization procedure. The NAF can authorize the client for access to dynamic adaptive streaming over hypertext transfer protocol (HTTP) (DASH) content subject to content-specific policy information using the GBA-based authentication and authorization procedure. The NAF can deliver the DASH content to the client when the client is successfully authenticated and authorized using the GBA-based authentication and authorization procedure.

21 Claims, 13 Drawing Sheets

Related U.S. Application Data

(60) Provisional application No. 61/824,338, filed on May 16, 2013, provisional application No. 61/821,635, filed on May 9, 2013, provisional application No. 61/753,914, filed on Jan. 17, 2013.

(51) Int. Cl.
| | |
|---|---|
| *H04N 21/2343* | (2011.01) |
| *H04N 21/258* | (2011.01) |
| *H04N 21/414* | (2011.01) |
| *H04N 21/462* | (2011.01) |
| *H04N 21/61* | (2011.01) |
| *H04N 21/643* | (2011.01) |
| *H04N 21/845* | (2011.01) |
| *H04L 9/32* | (2006.01) |

(52) U.S. Cl.
CPC .......... *H04L 65/4084* (2013.01); *H04L 65/60* (2013.01); *H04L 65/605* (2013.01); *H04L 67/02* (2013.01); *H04N 21/23439* (2013.01); *H04N 21/25816* (2013.01); *H04N 21/41407* (2013.01); *H04N 21/4621* (2013.01); *H04N 21/6175* (2013.01); *H04N 21/6181* (2013.01); *H04N 21/64322* (2013.01); *H04N 21/8456* (2013.01); *Y02D 30/70* (2020.08)

(56) References Cited

U.S. PATENT DOCUMENTS

| | | | | | |
|---|---|---|---|---|---|
| 8,555,345 | B2* | 10/2013 | Torvinen | ............... | H04L 9/0838 380/247 |
| 8,924,582 | B2* | 12/2014 | Giladi | ................... | H04L 67/108 709/231 |
| 9,160,779 | B2* | 10/2015 | Cherian | ................ | H04L 65/605 |
| 9,712,506 | B2* | 7/2017 | Holtmanns | ............. | H04L 63/06 |
| 10,057,277 | B2* | 8/2018 | Wang | ................. | H04L 63/0846 |
| 10,116,452 | B2* | 10/2018 | Giladi | .................. | H04L 63/123 |
| 10,477,257 | B2* | 11/2019 | Ma | .................... | H04N 21/63345 |
| 2003/0084179 | A1* | 5/2003 | Kime | ................ | H04L 29/06027 709/231 |
| 2004/0259534 | A1 | 12/2004 | Chaudhari et al. | | |
| 2007/0044157 | A1* | 2/2007 | Taguchi | .................. | G06F 21/10 726/27 |
| 2009/0013381 | A1* | 1/2009 | Torvinen | ............... | H04L 9/0838 726/3 |
| 2010/0268836 | A1 | 10/2010 | Jabri et al. | | |
| 2010/0303242 | A1* | 12/2010 | Holtmanns | ............. | H04L 63/06 380/278 |
| 2011/0246616 | A1 | 10/2011 | Ronca et al. | | |
| 2011/0264913 | A1* | 10/2011 | Nikander | ........... | H04L 63/0815 713/168 |
| 2012/0124179 | A1 | 5/2012 | Cappio et al. | | |
| 2012/0209952 | A1 | 8/2012 | Lotfallah et al. | | |
| 2012/0259994 | A1* | 10/2012 | Gillies | ................ | H04L 12/1881 709/231 |
| 2012/0331293 | A1* | 12/2012 | Ma | ........................ | H04L 9/0891 713/168 |
| 2013/0007814 | A1* | 1/2013 | Cherian | ................ | H04L 65/605 725/62 |
| 2013/0042100 | A1* | 2/2013 | Bouazizi | ............ | H04N 21/6543 713/151 |
| 2013/0111028 | A1* | 5/2013 | Kondrad | ............ | H04L 65/1016 709/225 |
| 2013/0174271 | A1* | 7/2013 | Handal | ................... | G06F 21/10 726/27 |
| 2013/0182643 | A1* | 7/2013 | Pazos | ................. | H04L 65/4076 370/328 |
| 2013/0185756 | A1* | 7/2013 | Frojdh | ................ | H04N 21/23439 725/88 |
| 2013/0290697 | A1* | 10/2013 | Wang | ................. | H04L 63/0428 713/150 |
| 2013/0291082 | A1* | 10/2013 | Giladi | ................... | H04L 63/123 726/7 |
| 2013/0294747 | A1* | 11/2013 | Takahashi | ........... | H04N 21/2187 386/241 |
| 2014/0013103 | A1* | 1/2014 | Giladi | ................. | H04L 63/0428 713/150 |
| 2014/0013375 | A1* | 1/2014 | Giladi | .................... | H04L 67/108 725/112 |
| 2014/0019587 | A1* | 1/2014 | Giladi | ............... | H04L 29/06476 709/217 |
| 2014/0019635 | A1* | 1/2014 | Reznik | .................. | H04L 65/607 709/231 |
| 2014/0020111 | A1* | 1/2014 | Wang | ...................... | G06F 21/10 726/26 |
| 2014/0041010 | A1* | 2/2014 | Udupa | ............... | H04L 63/0428 726/10 |
| 2014/0095890 | A1* | 4/2014 | Mangalore | .............. | G06F 21/10 713/189 |
| 2014/0096271 | A1* | 4/2014 | Wang | ...................... | G06F 21/10 726/30 |
| 2014/0101445 | A1* | 4/2014 | Giladi | ................... | H04L 9/0637 713/168 |
| 2014/0156865 | A1* | 6/2014 | Giladi | ................... | H04L 65/608 709/231 |
| 2014/0233740 | A1* | 8/2014 | Niamut | ................. | H04L 9/3013 380/279 |
| 2014/0237243 | A1* | 8/2014 | Ma | ........................ | H04L 9/0891 713/168 |
| 2014/0310527 | A1* | 10/2014 | Veugen | .................. | H04L 9/3013 713/171 |
| 2015/0089533 | A1* | 3/2015 | Giladi | ................... | H04L 67/108 725/25 |
| 2015/0121484 | A1* | 4/2015 | Liu | ...................... | G06F 16/9566 726/5 |
| 2015/0195259 | A1* | 7/2015 | Wang | .................. | H04L 63/0428 713/150 |
| 2015/0381692 | A1* | 12/2015 | Giladi | ................... | H04L 67/108 709/217 |
| 2016/0050241 | A1* | 2/2016 | Lotfallah | ............ | H04L 67/2804 709/219 |
| 2016/0105403 | A1* | 4/2016 | Giladi | ................... | H04L 9/0637 713/168 |
| 2016/0197939 | A1* | 7/2016 | Wang | ...................... | G06F 21/10 726/4 |
| 2016/0198203 | A1* | 7/2016 | Ma | ........................ | H04L 9/0891 380/200 |
| 2016/0255125 | A1* | 9/2016 | Lotfallah | ............ | H04L 65/1016 709/219 |
| 2016/0301670 | A1* | 10/2016 | Wang | .................. | H04L 63/0428 |
| 2016/0344706 | A1* | 11/2016 | Giladi | ................. | H04L 63/0428 |
| 2017/0104803 | A1* | 4/2017 | Giladi | ................... | H04L 67/108 |
| 2017/0180138 | A1* | 6/2017 | Giladi | ................... | H04L 63/123 |
| 2018/0192102 | A1* | 7/2018 | Ma | .................... | H04N 21/63345 |
| 2020/0068241 | A1* | 2/2020 | Ma | ..................... | H04N 21/2541 |

FOREIGN PATENT DOCUMENTS

| | | |
|---|---|---|
| EP | 2530885 A1 | 12/2012 |
| JP | 2007529763 A | 10/2007 |
| JP | 2010503354 | 1/2010 |
| WO | WO 2007/022800 A1 | 3/2007 |
| WO | WO 2008/138677 A1 | 11/2008 |
| WO | WO 2013/003793 A1 | 1/2013 |

OTHER PUBLICATIONS

Search Query Report from IP.com (performed Aug. 14, 2020) (Year: 2020).*

3GPP TS 26.247; 3rd Generation Partnership Project; Technical Specification Group Services and System Aspects; Transparent end-to-end Packet switched Streaming Service (PSS); Progressive Download and Dynamic Adaptive Streaming over HTTP (3GP-DASH); (Mar. 2013); 114 pages; V11.2.0.(Release 11).

3GPP TS 33.220; 3rd Generation Partnership Project; Technical Specification Group Services and System Aspects; Generic Authen-

(56) References Cited

OTHER PUBLICATIONS tication Architecture (GAA); Generic Bootstrapping Architecture (GBA); (Mar. 2013); 92 pages; V12.0.0 (Release 12).
3GPP TS 33.222; 3$^{rd}$ Generation Partnership Project; Technical Specification Group Services and System Aspects; Generic Authentication Architecture (GAA); Access to network application functions using Hypertext Transfer Protocol over Transport Layer Security (HTTPS); (Mar. 2013); 33 pages; V12.1.0 (Release 12).
ETSI TS 102 690; "M2M Service Bootstrap procedures"; (Oct. 2011); 16 pages; V1.1.1.
Franks et al.; "HTTP Authentication: Basic and Digest Access Authentication"; Internet Engineering Task Force Standards Track Request for Comments 2617; (Jun. 1999); 31 pages.
ISO/IEC JTC 1/SC 29 et al.; "Information technology—Dynamic adaptive streaming over HTTP (DASH)—Part 1: Media presentation description and segment formats"; ISO/IEC 23009-1:2012(E); (Jan. 5, 2012); 133 pages.
ISO/TEC JTC1/SC 29 et al.; "Information technology—Dynamic adaptive streaming over HTTP (DASH)—Part 4: Segment encryption and authentication"; ISO/IEC FCD 23009-4; (Aug. 4, 2012); 29 pages.
Niemi et al.; "Hypertext Transfer Protocol (HTTP) Digest Authentication Using Authentication and Key Agreement (AKA)"; Informational Request for Comments 3310; (Sep. 2002); 18 pages.
ETSI TS 102 690; "Machine-to-Machine Communications (M2M); Functional Architecture;" Technical Specification; (Oct. 2011); pp. 17-31; V1.1.1.

\* cited by examiner

```
<?xml version="1.0" encoding="UTF-8"?>
<xs:schema targetNamespace="urn:mpeg:dash:schema:sea:2013"
    attributeFormDefault="unqualified"
    elementFormDefault="qualified" xmlns:xs="http://www.w3.org/2001/XMLSchema"
    xmlns="urn:mpeg:dash:schema:sea:2013" xmlns:dash="urn:mpeg:dash:schema:mpd:2011">

<!--URL Authenticity signaling -->

<xs:complexType name="URLAuthenticity">
        <xs:attribute name="keyUriTemplate" type="xs:anyURI" use="required"/>
        <xs:attribute name="authSchemeIdUri" type="xs:anyURI" use="required"/>
        <xs:attribute name="authUrlTemplate" type="xs:anyURI" use="required"/>
        <xs:attribute name="authTagLength" type="xs:unsignedInt"/>
        <xs:attribute name="validityExpires" type="xs:dateTime" use="required"/>
        <xs:attribute name="inbandAuthTag" type="xs:boolean"/>
    </xs:complexType>
</xs:schema>
```

FIG. 8
(Table 2)

```xml
<!-- Representation base (common attributes and elements) -->
<xs:complexType name="RepresentationBaseType">
  <xs:sequence>
    <xs:element name="FramePacking" type="DescriptorType" minOccurs="0" maxOccurs="unbounded"/>
    <xs:element name="AudioChannelConfiguration" type="DescriptorType" minOccurs="0" maxOccurs="unbounded"/>
    <xs:element name="ContentProtection" type="DescriptorType" minOccurs="0" maxOccurs="unbounded"/>
    <xs:element name="ContentAuthorization" type="DescriptorType" minOccurs="0" maxOccurs="unbounded"/>
    <xs:any namespace="##other" processContents="lax" minOccurs="0" maxOccurs="unbounded"/>
  </xs:sequence>
  <xs:attribute name="profiles" type="xs:string"/>
  <xs:attribute name="width" type="xs:unsignedInt"/>
  <xs:attribute name="height" type="xs:unsignedInt"/>
  <xs:attribute name="sar" type="RatioType"/>
  <xs:attribute name="frameRate" type="FrameRateType"/>
  <xs:attribute name="audioSamplingRate" type="xs:string"/>
  <xs:attribute name="mimeType" type="xs:string"/>
  <xs:attribute name="segmentProfiles" type="xs:string"/>
  <xs:attribute name="codecs" type="xs:string"/>
  <xs:attribute name="maximumSAPPeriod" type="xs:double"/>
  <xs:attribute name="startWithSAP" type="SAPType"/>
  <xs:attribute name="maxPlayoutRate" type="xs:double"/>
  <xs:attribute name="codingDependency" type="xs:boolean"/>
  <xs:attribute name="scanType" type="VideoScanType"/>
  <xs:anyAttribute namespace="##other" processContents="lax"/>
</xs:complexType>

<!-- Stream Access Point type enumeration -->
<xs:simpleType name="SAPType">
  <xs:restriction base="xs:unsignedInt">
    <xs:minInclusive value="0"/>
    <xs:maxInclusive value="6"/>
  </xs:restriction>
</xs:simpleType>

<!-- Video Scan type enumeration -->
<xs:simpleType name="VideoScanType">
  <xs:restriction base="xs:string">
    <xs:enumeration value="progressive"/>
    <xs:enumeration value="interlaced"/>
    <xs:enumeration value="unknown"/>
  </xs:restriction>
</xs:simpleType>
```

FIG. 9
(Table 4)

DASH-AWARE NETWORK APPLICATION FUNCTION (D-NAF)

RELATED APPLICATIONS

The present application is a continuation of U.S. patent application Ser. No. 14/653,779 filed Jun. 18, 2015, which claims priority to U.S. Provisional Patent Application Ser. No. 61/753,914 filed Jan. 17, 2013, U.S. Provisional Patent Application Ser. No. 61/821,635 filed May 9, 2013, and U.S. Provisional Patent Application Ser. No. 61/824,338 filed May 16, 2013, the entire specifications of which are hereby incorporated by reference in their entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

The wireless device can be used receive multimedia delivery of Internet video using various protocols, such as hypertext transfer protocol (HTTP) streaming. A protocol to provide HTTP-based delivery of video streaming can include dynamic adaptive streaming over HTTP (DASH).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 8 (i.e., Table 2) illustrates a table of extensible markup language-syntax (XML-syntax) of common group and representation of attributes and elements including a UrlAuthenticity element in accordance with an example;

FIG. 9 (i.e., Table 4) illustrates a table of extensible markup language-syntax (XML-syntax) of common group and representation of attributes and elements including a ContentAuthorization element in accordance with an example;

Figure 1:
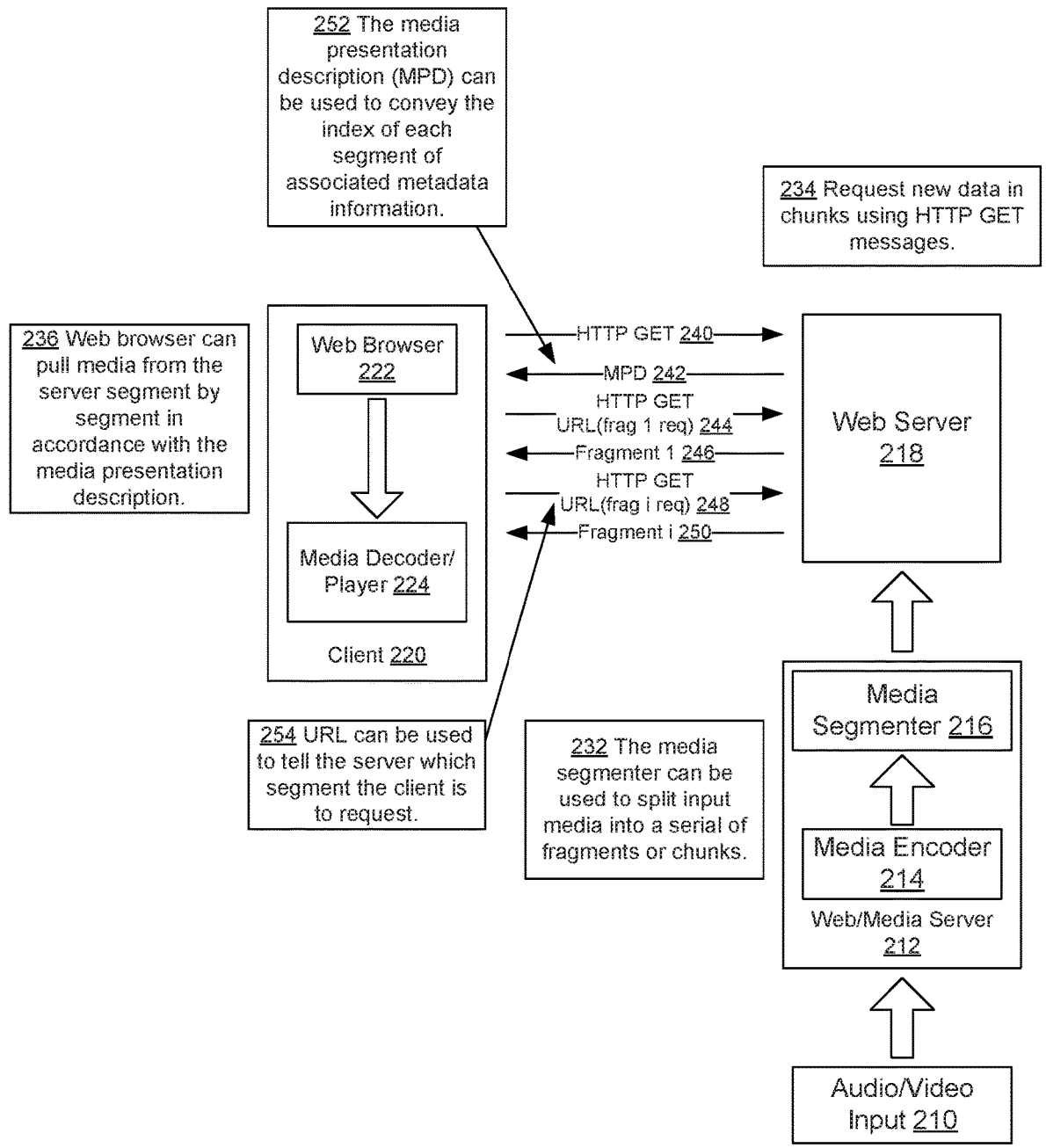
FIG. 1 illustrates a block diagram at a client and servers for dynamic adaptive streaming over hypertext transfer protocol (HTTP) (DASH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

Dynamic adaptive streaming over HTTP (DASH) can be a standardized HTTP streaming protocol. In DASH, a media presentation description (MPD) metadata file can provide information on the structure and different versions of the media content representations stored in the server including different bitrates, frame rates, resolutions, or codec types. In addition, DASH can also specify segment formats. The MPD metadata file can contain information on the initialization and media segments for a media player (e.g., the media player can look at initialization segment to determine a container format and media timing information) to ensure mapping of segments into a media presentation timeline for switching and synchronous presentation with other representations. Based on this MPD metadata information that describes the relation of the segments in forming a media presentation, clients (or client devices) can request the segments using HTTP GET or partial GET methods. The client can fully control the streaming session. For example, the client can manage an on-time request and smooth playout of the sequence of segments, and potentially adjusting bitrates or other attributes (e.g., to react to changes of the device state or the user preferences). DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the available bandwidth changes. Thus, DASH can allow for fast adaptation to changing network and wireless link conditions, user preferences and device capabilities, such as a display resolution, the type of central processing unit (CPU) employed, or memory resources available, and so forth.

In DASH, a media presentation description (MPD) metadata file can provide information on the structure and different versions of the media content representations stored in a web and/or media server 212, as illustrated in FIG. 1. The different versions of the media content representations can include different bitrates, frame rates, resolutions, codec types, or other similar types of information. In addition, DASH can also specify the segment formats, which can contain information on initialization and media segments for a media engine to ensure mapping of segments into a media presentation timeline for switching and synchronous presentation with other representations. Based on the MPD metadata information, which describes the relationship of the segments and how the segments form a media presentation, a client 220 can request the segments using an HTTP GET 240 message or a series of partial GET messages. The client can control the streaming session, such as managing an on-time request and smooth playout of a sequence of segments, or potentially adjusting bitrates or other attributes, to react to changes of a device state or a user preference.

FIG. 1 illustrates a DASH-based streaming framework. A media encoder 214 in the web/media server 212 can encode an input media from an audio/video input 210 into a format for storage or streaming. A media segmenter 216 can be used to split the input media into a serial of fragments or chunks 232, which can be provided to a web server 218. The client 220 can request new data in chunks using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations, as shown in the associated metadata information 252. The web browser can pull media from the server segment by segment in accordance with the MPD 242 as shown in 236. For instance, the web browser can request a first fragment using a HTTP GET URL(frag 1 req) 244. A uniform resource locator (URL) or universal resource locator can be used to tell the web server which segments the client is to request 254. The web server can provide the first fragment (i.e., fragment 1 246). For subsequent fragments, the web browser can request a fragment i using a HTTP GET URL(frag i req) 248, where i is an integer index of the fragment. As a result, the web server can provide a fragment i 250. The fragments can be presented to the client via a media decoder and/or player 224.

Figure 2:
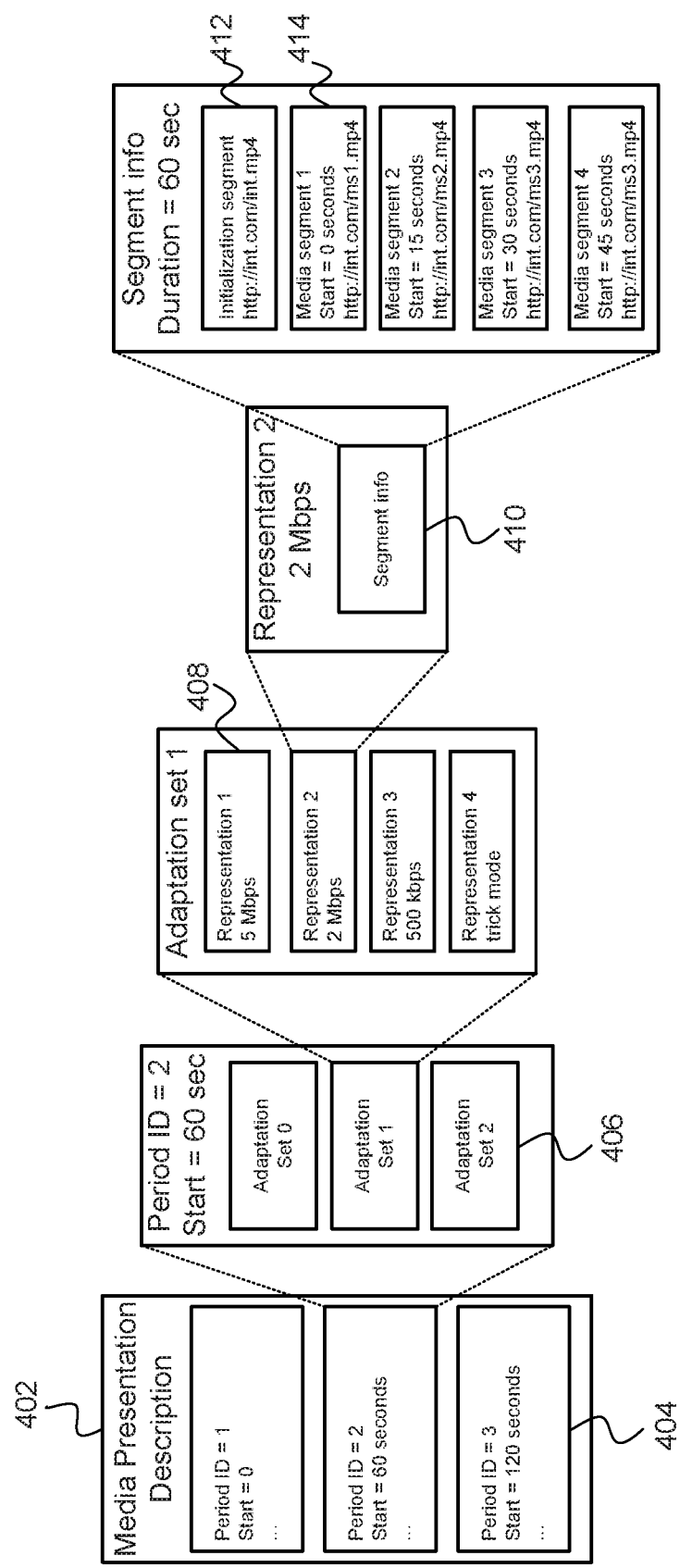
FIG. 2 illustrates a block diagram of a media presentation description (MPD) metadata file configuration in accordance with an example.

As illustrated in FIG. 2, DASH can specify different formats for a media presentation description (MPD) metadata file 402 that provides information on the structure and different versions of the media content representations stored in the server as well as the segment formats (or fragment formats). In DASH, a media presentation description (MPD) metadata 402 can provide information on the structure and different versions of the media content representations stored in a web and/or media server. In the example illustrated in FIG. 2, the MPD metadata can be temporally divided into periods 404 having a predetermined length, such as 60 seconds in this example. Each period can include a plurality of adaptation sets 406. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set may also include audio in different languages. The different alternatives offered in the adaptation set are referred to as representations 408.

In FIG. 2, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video, or portrait or landscape oriented video. Each representation 408 can include segment information 410. The segment information can include initialization information 412 and the actual media segment data 414. In this example, an MPEG-4 (MP4) file is streamed from a server to a mobile device. While MP4 is used in this example, a wide variety of different codecs may be used. A codec is a device, application, element, or computer program capable of encoding or decoding a digital data stream or signal.

The multimedia in the adaptation set can be further divided into smaller segments. In the example of FIG. 2, the 60 second video segment of adaptation set 1 is further divided into four sub-segments 414 of 15 seconds each. These examples are not intended to be limiting. The actual length of the adaptation set and each media segment or sub-segment is dependent on the type of media, system requirements, potential types of interference, and so forth. The actual media segments or sub-segments may have a length that is less than one second to several minutes long.

The DASH standard can include a segment authentication framework allowing use of digital signatures or digests for DASH segment types in order to verify the origin and content authenticity. Signatures (or digests) may be provided for media segments or media sub-segments, as well as for initialization, index, and bit stream switching segments. As used herein, the term signature and digest may be used interchangeably for the same feature or element. The segment authentication framework can calculate a signature of an unencrypted segment, and store the value externally. An MPD interface can provide URL templates to retrieve the signatures, using HTTP or secure HTTP (HTTPS). HTTPS is a communications protocol for secure communication over a computer network, with especially wide deployment on the Internet. The client can retrieve the signature, and then calculate the signature locally on an unencrypted media segment or sub-segment using a validation key, and can reject the media segment or sub-segment in case of a mismatch between the retrieved signature and the calculated signature. Rejected media segment or sub-segment may not be viewed or played at the client device.

Figure 3:
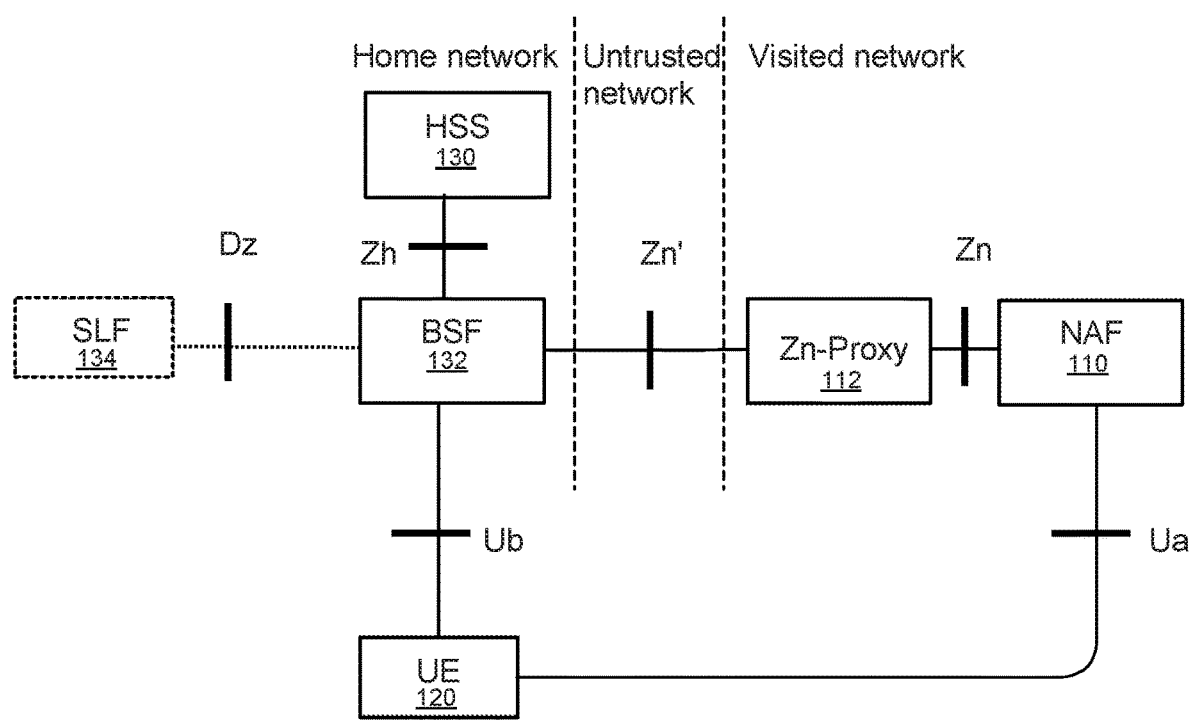
FIG. 3 illustrates an example of third generation partnership project (3GPP) generic authentication architecture (GAA) network entities and interfaces in accordance with an example.

The segment authentication framework can be implemented in a 3GPP generic authentication architecture (GAA). Owners of mobile devices can access different services using some kind of authentication (i.e., towards ensuring confidentiality of communication, content integrity and client and/or server identity validation). The GAA can provide authentication and key agreement between a client (or client device) and services on the Internet or in a cellular operator's network. The GAA can be an authentication service provided by the cellular network operator allowing the client and the service to authenticate each other. The user authentication can be instantiated by a shared secret, which can be located both in a smartcard inside the client device (e.g., UE 120) and on a home subscriber server (HSS) 130, as illustrated in FIG. 3. The GAA can authenticate by making a network component challenge the smartcard and verify that the answer is similar to the answer predicted (e.g., XRES) by the HSS. The GAA can be leveraged to enable application functions both in the network and on the user side to establish shared keys. For example, 3GPP can provide a "bootstrapping of application security" to authenticate a subscriber by defining a generic bootstrapping architecture (GBA) based on an authentication and key agreement (AKA) protocol.

Asymmetric cryptography, also known as public-key cryptography, can refer to a cryptographic algorithm which uses two separate keys, where one key is secret (or private) and another key is public. Although the public and private keys are different, the two parts of this key pair can be mathematically linked. The public key can be used to encrypt plaintext or to verify a digital signature; whereas the private key can be used to decrypt cipher text or to create a digital signature. The term "asymmetric" can refer to the use of different keys to perform these opposite functions, where each function can be the inverse of the other function. In contrast, conventional or "symmetric" cryptography can rely on a same key to perform both encryption and decryption.

The GAA can provide fresh key material for clients and servers that use shared secret based authentication and the GAA can sign certificates for those applications which can use asymmetric authentication. The UEs 120 can authenticate themselves to the operator's GAA service by existing third generation (3G) or second generation (2G) authentication protocols, and in the process of authentication receive new keys. The services, which the users (e.g., UE) want to use, can also fetch the keys from the GAA. As a result, the clients and servers can share secrets (or secret keys). In addition to other services, the GAA can also be used to authenticate clients to a public key infrastructure (PKI), which infrastructure can then be asked to sign certificates for the client's public key(s).

The GAA can authenticate users using one of at least two different processes. A first GAA authentication process can be based on a shared secret between the client and the server. A second GAA authentication process can be based on public and private key pairs and digital certificates. In the shared secret process (i.e., first process), the client (e.g., UE 120) and the operator can be first mutually authenticated by means of a 3G authentication and key agreement (AKA) and the client and the operator can agree on session keys that can later be used between the client and the services (i.e., in a network application function (NAF) 110) which the client wants to use. The first process can be referred to as bootstrapping. Bootstrapping (or booting) can refer to a group of metaphors which refer to a self-sustaining process that can proceed without external help. After the bootstrapping process, the services can fetch the session keys from the operator, and the session keys can be used in some application specific protocol between the client and the services.

In a second GAA authentication process, the GAA can be used to authenticate a certificate enrollment request by the client. First the bootstrapping procedure can carried out as in the first GAA authentication process. After this bootstrapping procedure, the client can request certificates from an operator's public-key infrastructure (PKI), where the authentication can be performed by the session keys obtained by accomplishing the bootstrapping procedure. These certificates and the corresponding key pairs can then be used to produce digital signatures or to authenticate to a server instead of using the session keys. The PKI can include a set of hardware, software, people, policies, and procedures used to create, manage, distribute, use, store, and revoke digital certificates.

The bootstrapping server function (BSF) 132 can be used for authorizing the user for content and access to the user credentials. The BSF has an interface with the HSS using the Zh interface. The UE 120 can run the AKA protocol with the HSS 130 via the BSF. The AKA protocol can result in a cipher key (CK) and/or integrity key (IK). From the resulting CK and IK, a session key can be derived in the BSF and the UE. An application server (referred to as a network application function (NAF) in 3GPP technical specification (TS) 33.220 V11.4.0 (September 2012)) can fetch this session key from the BSF together with subscriber profile information. In this way, the application server (acting as NAF) and the UE share a secret key that can subsequently be used for application security, such as authenticating the UE and the NAF at the start of the application session. The secret key may also be used for integrity and/or confidentiality protection, which may expand the scope and functionality of the GAA. Among other protocols, HTTPS or HTTP over transport layer security (TLS) (or HTTP/TLS) may be used to secure the application session between the UE and the application server. An authentication proxy (e.g., Zn proxy 112) may serve as a TLS end point to authenticate the UE using the means of the GAA (e.g., authentication proxy acting as the NAF).

FIG. 3 illustrates some the GAA network entities and the interfaces between the GAA network entities. Optional entities are shown with dashed lines and network borders (e.g., home network, untrusted network, and visited network) with dotted dash lines. The UE 120 and the BSF 132 can mutually authenticate themselves over the Ub interface by using a HTTP digest AKA protocol and agreeing on session keys that can afterwards be applied between UE and the NAF 110. The UE also communicates with the NAF, which can include the application servers, over the Ua interface, which can use any application specific protocol. The BSF can retrieve the subscriber's data from the HSS 130 over the Zh interface, which can use a diameter base protocol. The HSS can manage user information (e.g., identities, authentication keys, subscriptions, rights, and so forth) and profiles (e.g., service profiles and so forth). If several HSSs exist in the network, BSF may first determine a proper HSS to use. This determination can be made by either configuring a pre-defined HSS to BSF list, or by querying a subscriber locator function (SLF) 134 over a Dz interface. The NAFs can retrieve the session keys from BSF over the Zn interface, which can also use the diameter base protocol.

A generic bootstrapping architecture (GBA) can be described in 3GPP TS 33.220. The GBA usage can be divided into at least two procedures: the bootstrapping authentication procedure and the bootstrapping usage procedure. The bootstrapping authentication procedure can include authenticating the client to a home network and deriving the key material. In the usage procedure, the UE can inform the NAF on what key to use and the NAF can then fetch the specified key from the BSF. The authentication protocol can use a HTTP digest AKA.

At least two different authentication mechanisms can use the GBA, including the GBA_ME and GBA_U procedures (or processes). The GBA_U (GBA UICC or GBA USIM) process can stores keys in the 3G universal subscriber identity module (USIM) application of the universal integrated circuit card (UICC) (i.e., the subscriber identity module (SIM) card), instead of a SIM application (e.g., GBA_ME). As a result, the GBA_U process can be more secure than the GBA_ME process. However, the GBA_U process may modify the UICC.

Figure 4:
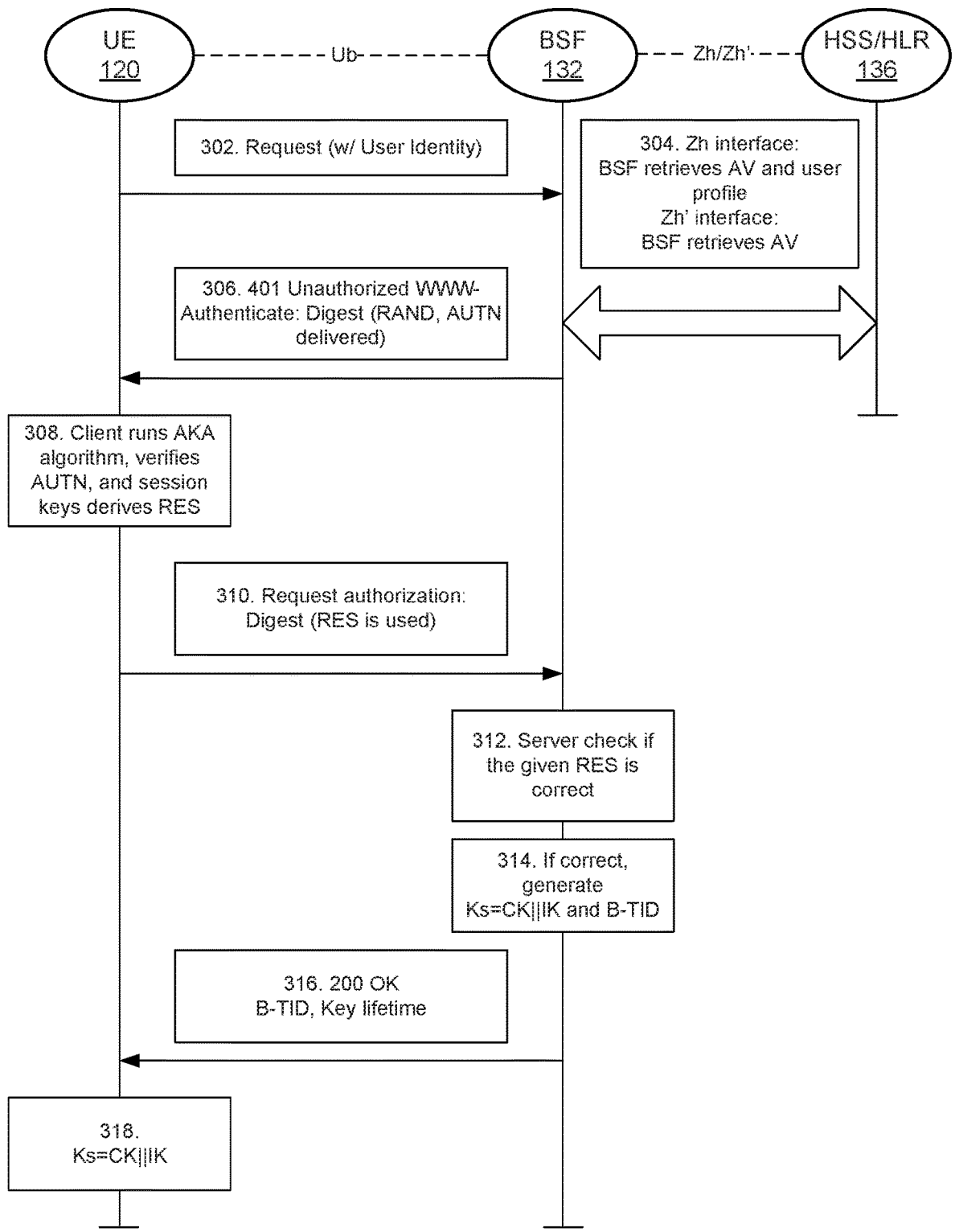
FIG. 4 illustrates an example of a message flow chart of the bootstrapping authentication process in accordance with an example.

FIG. 4 illustrates a message flow chart of the bootstrapping authentication procedure for GBA_ME (GBA mobile equipment (ME)) mechanism (or process), which is similar to 3GPP TS 33.220 FIG. 4.3. The GBA_ME authentication procedure can include two request-response pairs between the UE 120 and the BSF 132. First, the UE can send a request 302 with the UE's username (or user identity). The BSF can use the UE's username to fetch 304 the corresponding GBA user security settings (GUSS) including a user profile (using the Zh interface) and an authentication vector (AV) (using the Zh or Zh' interface) from the HSS and/or a home location register (HLR). The authentication vector can include random (RAND), authentication token (AUTN), expected response (XRES), cipher key (CK), and/or integrity key (IK) values. Of these values, the BSF can send 306 a digest including the RAND and AUTN with an authentication challenge response to UE (e.g., 401 unauthorized World Wide Web-authenticate (WWW-authenticate) signaling). The digest with the authentication challenge response can demand that the UE authenticate itself. The UE can run AKA algorithms on the UE's SIM, authenticate the BSF by verifying the AUTN, and derive a response (RES) value and the session keys (i.e., CK and IK). Thus, after running the AKA algorithms, session keys IK and CK can exist in both the BSF and the UE, where the session keys can be provided to the BSF earlier in the AV. After generating session keys, the UE can send 310 a second request with the derived RES value. Then, the BSF can authenticate the user by comparing 312 the RES from UE to the XRES in the authentication vector (AV). If the RES matches the XRES, UE can be authenticated, and BSF can create 314 a bootstrapping transaction identifier (B-TID) from the RAND value and the BFS's name. Then, the B-TID can be included in a 200 OK response message 316 to UE. The 200 OK response can also include the lifetime of the key material Ks. Both UE and BSF can now create 314 and 318 the Ks by concatenating stored keys CK and IK. However, the actual key material Ks_NAF may be computed from the Ks on demand (i.e., in UE when the UE starts communicating with NAF, and in BSF when Ks_NAF is queried by NAF). The Ks_NAF can be created by using a key derivation function.

The GBA_U process can be an extension of the GBA_ME process previously described with some differences. With the GBA_U process, the keys CK and IK may not leave the UICC in the UE 120. In the GBA_U bootstrapping procedure, the AUTN sent by BSF 132 in the 401 authentication challenge message 306 can be different from the AUTN in the GBA_ME process. When UE receives the challenge, the mobile equipment (ME) part of the UE can send the RAND and the AUTN to the UICC, which can then compute CK, IK, and RES. Then the UICC can store the CK and IK values and provide the RES for ME to be sent to the BSF. After the GBA_U bootstrapping process, the BSF and the UICC can create Ks_NAF, similar to the GBA_ME process.

Figure 5:
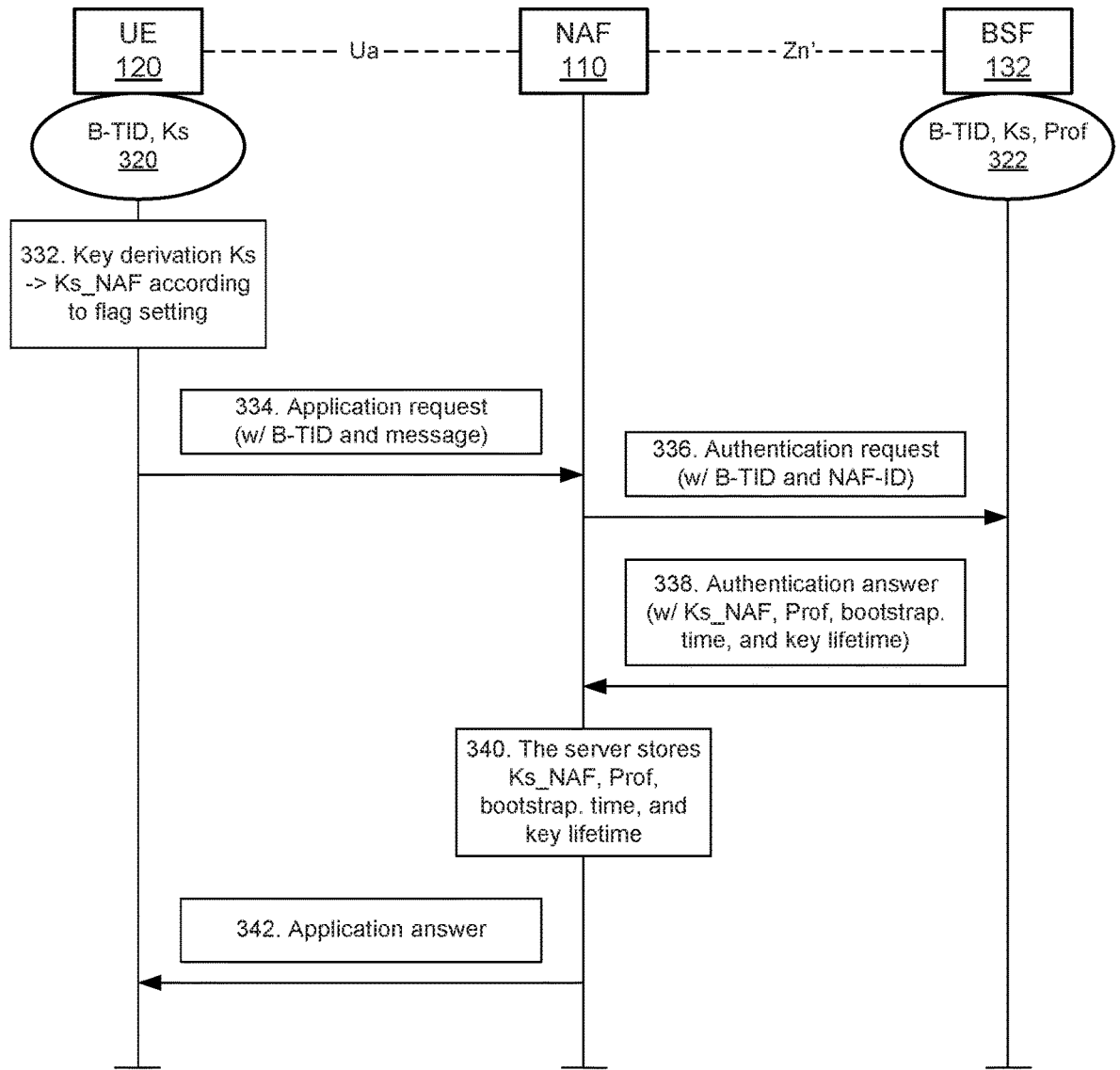
FIG. 5 illustrates an example of a message flow chart of the bootstrapping usage process in accordance with an example.

FIG. 5 illustrates a message flow chart of the bootstrapping usage procedure (or process), which is similar to 3GPP TS 33.220 FIG. 4.4. The UE 120 can include the B-TID and the Ks 320, and the BSF 132 can include the B-TID and the Ks 322. The UE can derive 332 the keys Ks_NAF from the Ks. Then, the UE can send 334 an application request with the B-TID and a message (msg) to the NAF 110. The message can include an application specific dataset. Then, the NAF can send 336 an authentication request to the BSF to get the key material corresponding to a given B-TID. The authentication request can also include a NAF identifier (NAF-Id or NAF-ID), which can includes a NAF's public hostname used by the UE and a Ua security protocol identifier. The BSF can verify that the NAF is authorized to use a given hostname. If the hostname verification is successful and a key is found with the given B-TID, the BSF can send 338 the Ks_NAF with the K_NAFs' bootstrapping time and key lifetime and user profile (Prof) to the NAF. The Prof can include an application specific part of the user profile. In addition to Ks_NAF, the NAF may also request some application specific information from BSF. The NAF can store the Ks_NAF with the K_NAFs' bootstrapping time and key lifetime. The NAF can send 342 an application answer to the UE with the requested information. However, if no key is found with the B-TID, the BSF can inform the NAF of the missing B-TID, which can then send a bootstrapping renegotiation request to UE. UE may then perform the bootstrapping authentication procedure again, as illustrated in FIG. 4.

Figure 6:
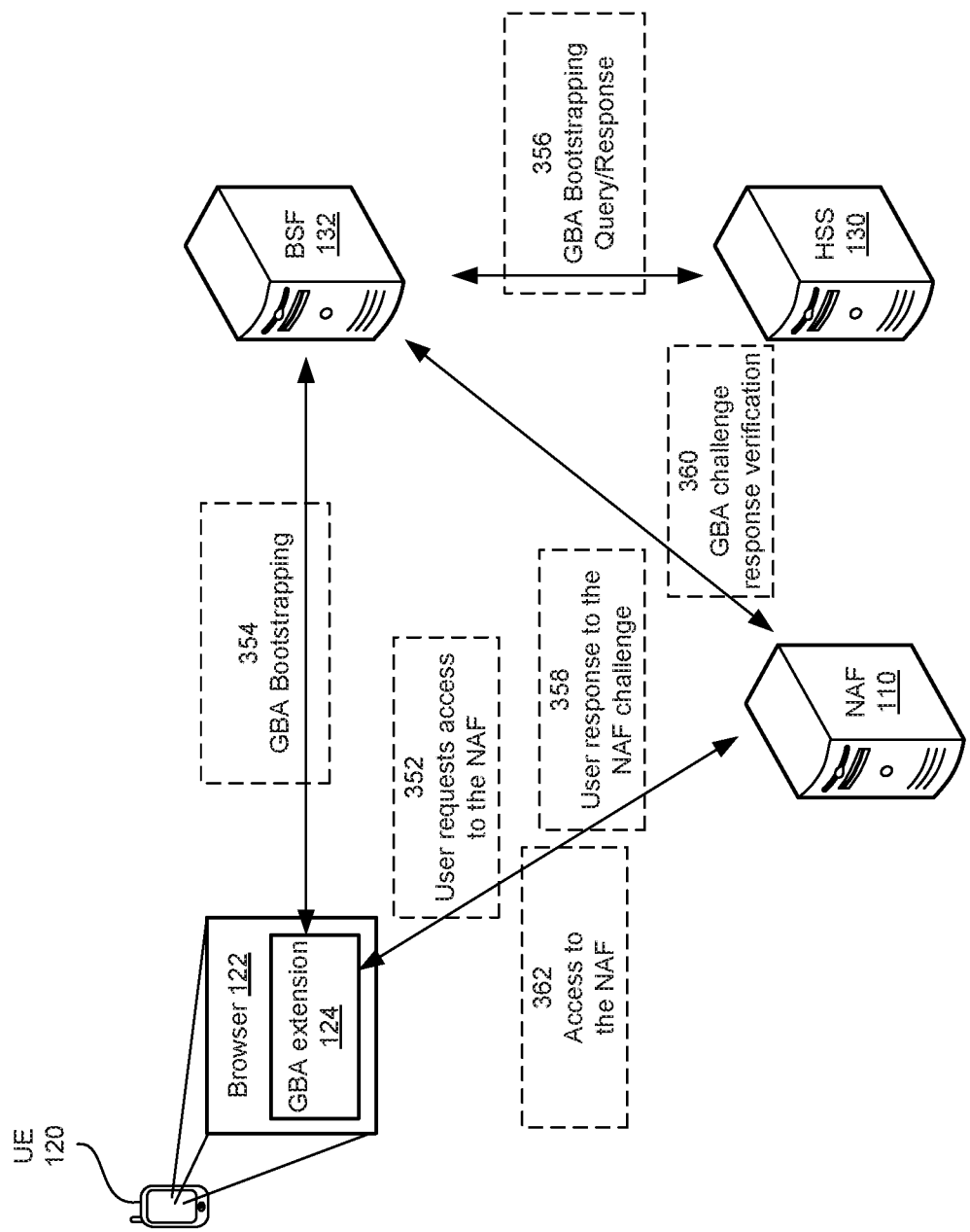
FIG. 6 illustrates an example of a flowchart of a generic bootstrapping architecture-based (GBA-based) authentication process in accordance with an example.

FIG. 6 depicts a flowchart of GBA-based authentication procedures. The user (e.g., UE 120) can request access to the NAF 352 using a browser. The UE can perform a GBA bootstrapping authentication procedure 354 with the BSF 132 (see FIG. 4) including a GBA bootstrapping query and response 356 with the HSS 130. After the bootstrapping authentication has been completed, the UE and a NAF 110 can run some application specific protocol where the authentication of messages can be based on session keys generated during the mutual authentication between UE and BSF. For instance, the UE can respond to a NAF challenge 358 (e.g. B-TID) (see FIG. 5). The BSF can provide GBA challenge response verification of the UE for the NAF 360. Then, the UE can be granted access to the NAF 362.

Figure 7:
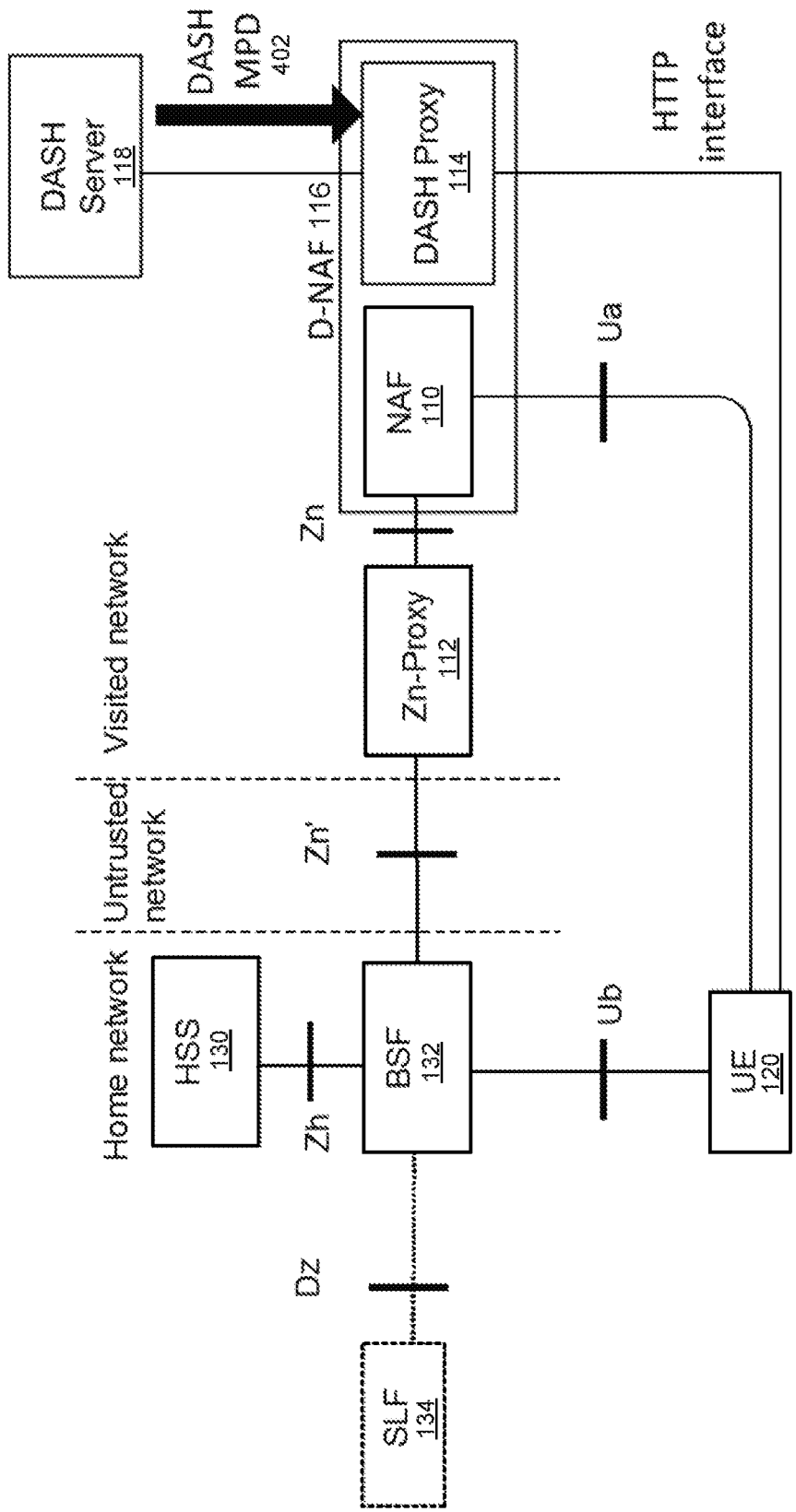
FIG. 7 illustrates an example of a dynamic adaptive streaming over hypertext transfer protocol (HTTP) aware (DASH-aware) network application function (D-NAF) in a third generation partnership project (3GPP) generic authentication architecture (GAA) in accordance with an example.

FIG. 7 illustrates a DASH-aware network application function (D-NAF) 116 component for the GAA that also can serve as a proxy server for DASH-based streaming. The D-NAF can include a NAF 110 and a DASH proxy 114 server that can communicate with a DASH server 118. The D-NAF via the DASH proxy can be configured to parse the DASH MPD 402 and use the retrieved DASH content information to optimize GAA-based authentication procedures. The DASH proxy can communicate with the UE via a HTTP interface.

The D-NAF can include various functions. For instance, the D-NAF can apply authentication policies in a DASH content-dependent manner, such as using different authentication policies (i.e., via different authentication keys) for different DASH representations and adaptation sets. The client may have different access rights or authorizations to receive different parts of a DASH-formatted stream for D-NAF authorization. In another example, the D-NAF can receive specific authentication policies from a DASH service provider and incorporate these policies from the DASH service provider into the user authentication. When the DASH-specific authentication policies are managed by the D-NAF, the operator network can be trusted to handle authentication on behalf of the service provider. DASH-specific authentication by the operator network can create new business possibilities for the operators and over-the-top (OTT) service providers. As such, the DASH MPD, for each representation (408 of FIG. 2) or adaptation set (406 of FIG. 2), may include specific signaling with regards to an authentication policy to be used in conjunction with this representation or adaptation set. The D-NAF can provide finer granularity of authentication for DASH content. In another configuration, the D-NAF can provide separate DASH content authorization via an external entity through a download of user authorization credentials or priority based access to credentials (i.e., in the DASH MPD) to allow the HSS to focus on network authorization during an overload scenario. For example, the GAA-based authentication procedures via BSF and HSS can be overridden by service provider's own authentication policies signaled in the MPD.

In another example, the D-NAF can be used for uniform resource locator (URL) authentication of DASH content or client authentication, which can be used to control access to a specific resource and also identify content as not intended for a certain group of users. Content and service providers, in order to protect their copyright and fulfill their licensing obligations, can restrict access to content and limit viewing times. Client authentication can be used to control access to a specific resource and also identify content as not intended for a certain group of users. For example, authentication keys for certain types of restricted material, such as copyrighted material or pay-per-view content, may be distributed only to authorized users. As another example, rating information (e.g., G, PG, PG-13, TV-14, or R) may be provided for parental control. In such settings, a client-specific authentication key can be delivered to the intended users, and only the users with the correct authentication key information may be allowed to access the content. Player programs, application, or devices can operate with specified modes that allow and/or prohibit play of DASH content as identified by the authentication keys for the content.

DASH content authentication via the D-NAF can have various applications (or use cases). Five use cases can illustrate some of the advantages and benefits of DASH content URL authentication. In a first use case, Alice can have a DASH-capable client application that allows her watch DASH-formatted content. She can be subscribed to Operator BestCoverage Telecom's mobile streaming service. She may be interested in watching a movie, "A Dash through the Clouds", which is available in a DASH format. The operator can restrict access to the movie to authorized users and employ 3GPP-based authentication mechanisms to restrict access (e.g., DASH content authentication). Since Alice may already subscribe to the mobile streaming service, her client application can be authenticated and she can enjoy the movie.

In a second use case, Alice and Bob can both have DASH-capable client applications that allow them watch DASH-formatted content. They can both be subscribed to Operator BestCoverage Telecom's mobile streaming service. Bob can pay for a 'premium streaming' plan while Alice can prefer (and pay for) a cheaper 'basic streaming' plan. They can both be interested in watching the movie "A Dash through the Clouds". The movie can be available in DASH format at different bitrates and/or resolutions. Due to Bob's premium plan subscription, Bob's client application can access and receive streams at various bitrates and/or resolutions offered by the service (e.g., by selecting, at a given time, a best resolution given a link bandwidth and device capabilities). Alice's client application may be restricted from accessing the highest bitrates and/or resolutions due to her basic subscription, so Alice's client application using DASH content authentication may only receive streams from a limited set of the available bitrates and/or resolutions.

In a third use case, the Operator BestCoverage Telecom (operator) may have recently invested significantly into the operator's infrastructure and may be looking for new business opportunities to increase the operator's service revenues by focusing on the over-the-top (OTT) content distribution value chain. Particularly, the operator may wish to leverage their information systems and network equipment (e.g., home subscriber subsystem (HSS)) that may contain valuable user information including authentication keys, user identities, and user service profiles. Such user information can enable the operator to perform a number of control functions including user authentication, authorization of user access to services, and billing on behalf of content and content distribution network (CDN) providers. The operator may have recently signed a security and/or authentication related service level agreement (SLA) with a DASH content provider, MyDASH, to distribute MyDASH's DASH-formatted content by fulfilling user authentication and authorization on behalf of MyDASH over the operator's 3GPP generic authentication architecture (GAA). MyDASH can host a tiered subscription service and provide enforcement of content-specific access restrictions for client authentication using the DASH content authentication.

In a fourth use case, the Operator BestCoverage Telecom (operator) may have recently signed a service level agreement (SLA) with over-the-top (OTT) DASH content provider, MyDASH, to distribute and/or resell MyDASH's DASH-formatted content. The operator can plan to use the DASH-formatted content from MyDASH to offer various new services to the operator's clients. The operator can use DASH content authentication to ensure integrity of the content and associated metadata for a consistent user experience. Even though the operator investments can be made to the operator's infrastructure to ensure security, the operator may also use the technology described herein to provision against the potential intrusions to during DASH content delivery from MyDASH. The operator can include a provision that commits MyDASH to a specified level of content delivery accuracy, as well as penalty provisions if the specified level of accuracy is not achieved. In response, MyDASH can enable authentication mechanisms for the operator to validate the integrity of the delivered content and MPD.

In a fifth use case, the Operator BestCoverage Telecom (operator) can sign service level agreements (SLA) with several over-the-top (OTT) DASH content providers to distribute and/or resell the DASH content providers' DASH-formatted content. The operator can use these DASH-formatted contents to offer various new services to the operator's clients. The operator can use DASH content authentication to ensure integrity of the content and associated metadata for a consistent user experience. In particular, the operator can employ a service via stream splicing to create media mashups by combining content from multiple sources. For instance, an advertisement insertion, for both video on demand (VoD) and live streams, provides an example of a possible media mashup. Such schemes (e.g., media mashups) can employ dynamic MPD generation or rewriting, but these schemes may not modify or remove segment URLs and other metadata used for DASH content authentication. Improper modification of MPD and segment URLs or other metadata may cause playback interruptions, and in a case of unplayed advertisements, improper modification of MPD and segment URLs or other metadata may result in loss of revenue for content providers and the operator.

The execution of media-specific (e.g., at representation 408 or adaptation 406 set levels of MPD 402 (FIG. 2)) authentication procedures can be used to realize the five use cases described. In other words, for different subscription policies (that may correspond to specific authentication keys), clients can be authenticated to receive the various DASH components (e.g., representations, adaptations sets, and so forth) differently. As such, the keys (e.g., Ks_NAF) provided to the NAF may not only be user specific, but can also be specific to the various DASH components to be accessed. Ks_NAF for DASH components may be enabled through the use of the GAA, if the HSS and/or HLR is already storing media-specific authentication credentials. Otherwise, DASH-based optimizations may also be possible via downloading of media-specific authentication rules and user credentials by the NAF from an external entity (instead of the HSS). Using an external entity (other than the HSS) for media-specific authentication rules and user credentials can help to reduce a load on the HSS, which may be challenged by network authentication procedures during overload scenarios. Using the external entity can reduce the number of challenges to the HSS by network authentication procedures during overload scenarios.

Communication of validation keys for authentication of URLs through signatures indicative of a content source can allow the DASH client to check the validity of the MPD URLs. The DASH client can also receive the content-specific authentication keys for various DASH components (e.g., the DASH period 404, adaptation set 406, or representation 408 (FIG. 2)). This communication or signaling can allow the client to retrieve the URL signatures, and then also calculate URL signatures locally based on the URLs in the received MPD and corresponding authentication key, and reject the corresponding content in case of a mismatch. Such content URL validation information (signatures or authentication keys) or their locations (URLs) may be signaled as part of the MPD or media segments. The framework or process can calculate a signature of a segment URL, and store the value externally along with the signature verification and/or authentication keys. The MPD interface can provide URL templates to retrieve these signatures, using HTTP or HTTPS. The DASH client can retrieve the signatures and authentication keys, then calculate the signatures locally on a given segment URL, and can reject the URL in case of a mismatch.

URL signing (or URL signatures) can be used to restrict access to content and enable user authentication of the DASH content. For instance, an infrastructure can be used for signing and validating content URLs, restricting access to some users, and/or limiting viewing times. A mechanism to restrict content access to a particular user can be to embed, within the content URL, the client IP address of the user for whom the content access was authorized. Similarly, to ensure that the content expires after a predetermined time, an expiry timestamp may be embedded. These values (e.g., client IP address and expiry timestamp) can then be validated against the actual client sending the request and the current time at the service engine serving the request. If either of the two validations fail, the request can rejected. However, because any of these strings in the URL can potentially be edited manually and circumvented by any knowledgeable user, shared with unauthorized users, or accessed beyond the time limit; a generated and attached signature to the URL can be used to protect against URL modification. The URL signatures can be achieved by attaching a keyed hash (e.g., signature) to the URL, using a secret key (e.g., Ks_NAF) shared only between the signer and the validating component. Once receiving an HTTP request, the content server may validate the signature with authorization parameters extracted from the request URL as inputs. If the computation result (e.g., calculated URL signature) matches with the URL signature in the request URL, the user can have legitimate access to the content.

Referring back to FIG. 7, the D-NAF 116 can enable content-specific authentication in conjunction with (or on top of) an existing user-specific authentication framework. A DASH-level signalling procedure can be used for conveying information to a DASH client using content-specific authentication keys. Content-specific authentication using the D-NAF can have various benefits.

For example, an intermediate network entity (e.g., an HTTP proxy or DASH proxy 114 residing inside a DASH-aware network application function (D-NAF) 116) can receive information on the content-specific authentication policies to be enforced by the content provider (e.g., authentication keys for specific DASH representations or adaptation sets of MPD). The D-NAF can receive the content-specific DASH authentication information (e.g., by parsing the DASH MPD). Then the D-NAF can use the retrieved DASH content information by incorporating and enforcing them as part of the GAA-based authentication procedures (e.g., FIGS. 4 and 5), jointly with any user-specific authentication credentials from the HSS. The keys (e.g., Ks_NAF) provided to the NAF may not only be user specific, but can also be specific to the DASH components to be accessed. As such, different authentication policies (i.e., via different authentication keys) for different DASH representations and adaptation sets may be enforced. Using different authentication policies for different DASH MPD components may imply that the client has different access rights or authorizations to receive different parts of a DASH-formatted stream. In another example, existing GAA-based authentication procedures via BSF and HSS may be overridden by a service provider's own authentication policies signaled at the DASH level (e.g., in the MPD file).

The intermediate network entity (e.g., an HTTP proxy or DASH proxy 114) can allow for DASH content and metadata integrity validation. The intermediate network entity may be a point of entry for the DASH content into the operator network. Communication of validation information (e.g., signatures or authentication keys) or their locations (URLs) allows the DASH proxy or HTTP proxy in the D-NAF to check the validity of the MPD URLs by authentication of URLs through signatures indicative of a content source. In addition, the DASH proxy or HTTP proxy in the D-NAF can also be used receive the content-specific authentication keys for various DASH components (e.g., representations, adaptation sets, and so forth). The DASH proxy can retrieve the URL signatures, and then locally calculate the URL signatures based on the URLs in the received MPD and the corresponding authentication key, and reject the corresponding content in case of a mismatch.

In some deployments, user authentication and content authentication may be processed separately using different entities. When user authentication and content authentication is separated, the existing GAA-based authentication architecture may be used for user authentication, while a DASH-level signalling framework can still be used for content authentication. The NAF and the service provider or content distribution network (CDN) may perform the content authentication.

DASH level signalling can be used for the transmission of authentication keys and signatures. DASH level authentication information signalling based on URL signing can also be used by the D-NAF to validate the authenticity of the DASH server.

For example, URL signatures and/or digests may be generated for the URLs contained in the MPD file. In a configuration, the information on the signatures can be communicated via the MPD file. The signature can be contained in the MPD file, or URLs pointing to these signatures can be contained in the MPD file, or a list or template-based URL construction rules to generate the URLs for these signatures may be contained in the MPD file. Thus, the MPD file can include a signature, a URL pointing to the signature, a list of URL construction rules to generate the URL for the signature, or template-based URL construction rules to generate the URL for the signature.

For instance, an URLAuthentication descriptor may be used in the MPD to declare the authentication framework and communicate the signature URLs. Multiple content authentication schemes can be defined. Moreover, a URL-Digest element may provide a template for constructing a URL, which can be further used for downloading the signature for a given URL. Similarly, a URLSignature element can provide a URL for key acquisition and a template for constructing a URL, which can be further used for downloading the signature for a given URL.

Different components of a URL may be authenticated differently. For example, a set of signatures may be included for the base URL (i.e., at the DASH MPD 402, period 404, adaptation set 406, or representation 408 level) for base URL authentication, and then the remaining URL components pointing to specific DASH representations and segments may be signed (or authenticated) separately, as shown in FIG. 2. In another example, a set of signatures may be included for the @sourceURL attribute in the SegmentBase element (e.g., DASH segment base) that can contain an absolute URL of a DASH segment for DASH segment base authentication. In another example, a set of signatures may be included for the Location element that includes an absolute URL for the MPD for DASH MPD location authentication. Authenticating the MPD location and the base URL and communicating the corresponding signatures to the DASH client can be beneficial for content source validation.

For DASH playlists (where each DASH segment is assigned a URL that is contained in the MPD), each playlist-specific URL may be signed or authenticated by signatures (i.e., at the DASH period 404, adaptation set 406, or representation 408 level) for DASH segment list authentication. For DASH templates (where URL of each DASH segment is generated by the DASH client by a pre-defined rule), each template-specific URL may be signed or authenticated by signatures (i.e., at the DASH period, adaptation set, or representation level) for DASH segment template authentication.

In another configuration, the information on the URL signatures may be carried or embedded within DASH segments instead of the MPD. In an example, the signatures can be carried within a file-level International Organization for Standardization-base media file format (ISO-BMFF) box (e.g., in initialization segment such as in a 'moov' box for ISO-BMFF or in media segments such as in a 'moof' box for ISO-BMFF). In another configuration, an indicator may be included in the MPD to signal the presence of the embedded information on the signatures within the DASH segments so that the DASH client can prepare to receive the signatures prior to segment reception.

In another example, an authenticity tag URLs may be provided for segment URLs via the MPD file, using an UrlAuthenticity element that declares the authentication framework and communicates the authentication key and signature URLs. The URL authentication can be optional if used with SupplementaryProperty descriptor, and mandatory if used with EssentialProperty descriptor. The value of @schemeIdUri in either EssentialProperty or SupplementalProperty can be "urn:mpeg:dash:sea:urlauth:2013" if the UrlAuthenticity element authentication framework is used.

In another configuration, the UrlAuthenticity element can be implemented in a DASH MPD based on 3GPP technical specification (TS) 26.247 V11.0.0 (September 2012) or defined as an EssentialProperty or SupplementalProperty based on the joint working group International Organization for Standardization (ISO)/International Electrotechnical Commission (IEC) 23009-1:2012, depending on the application. The UrlAuthenticity element can provide a URL for key acquisition and a template for constructing a URL, which can be further used for downloading the authenticity tag for a given MPD segment URL. For instance, the UrlAuthenticity element can be included in the MPD, where the MPD can have common attributes and elements. The semantics of UrlAuthenticity element can be as shown in Table 1. The UrlAuthenticity element can include attributes: @authSchemeIdUri, @authUrlTemplate, @authTagLength, @keyUrlTemplate, @validityExpires, or @inbandAuthTag. Each element or attribute can have an element or attribute name, use, or description. The 'use' column in Table 1 can have an attribute marked with 'M' (mandatory), 'O' (optional), 'OD' (optional with default value), or 'CM' (conditionally mandatory).

TABLE 1

| Element or Attribute Name | Use | Description |
| --- | --- | --- |
| UrlAuthenticity | | Specifies information necessary to compute an authenticity tag for segment URL |
| @authSchemeIdUri | M | Specifies the algorithm used for computing the authenticity tag |
| @authUrlTemplate | M | Specifies the template for creating the URL used for retrieving the authenticity tag value. Can be absent if @inbandAuthTag is true |
| @authTagLength | O | Specifies the length of an authentication tag in bits. If absent, the tag length is same as in the algorithm identified by @authSchemeIdUri |
| @keyUrlTemplate | O | Specifies the template for key URI generation, using syntax and variable substitution as defined in ISO/IEC 23009-1:2012, 5.3.9.4.4. |
| @validityExpires | M | Specifies (in wall clock time) the time when URL authenticity expires |
| @inbandAuthTag | OD | If true, authenticity tag appears within associated segments (in case such in-band carriage is specified) |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

Table 1

An example extensible markup language-syntax (XML-syntax) for the UrlAuthenticity element can be as shown in Table 2, illustrated in FIG. 8.

In another example, authentication and access authorization requirements of the DASH content may be signalled in the MPD, for example, in a descriptor named ContentAuthorization declared at the MPD hierarchy level of Common Adaptation Set, Representation and Sub-Representation attributes and elements, as shown in Table 3. Each element (e.g., ContentAuthorization element) or attribute can have an element or attribute name, use, or description. The 'use' column in Table 1 can have an element marked with <minOccurs> for a minimum number of occurrences and <maxOccurs> for a maximum number of occurrences where N equals an unbounded number of occurrences.

TABLE 3

| Element or Attribute Name | Use | Description |
| --- | --- | --- |
| Common attributes and elements | | |
| ContentAuthorization | 0 . . . N | Specifies information about content access authorization schemes used for the associated Representations |

TABLE 3-continued

| Element or Attribute Name | Use | Description |
| --- | --- | --- |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

An example extensible markup language-syntax (XML-syntax) for the the ContentAuthorization element can be as shown in Table 4, illustrated in FIG. 9.

For the ContentAuthorization element the @schemeIdUri attribute can be used to identify a content access authorization or a trusted client authentication scheme. This @schemeIdUri attribute may provide sufficient information, possibly in conjunction with the @value and/or extension attributes and elements, such as the authentication system(s), content access authorization policies and key distribution scheme(s) employed, to enable a client to determine whether the client can possibly gain authorization to play the protected content (e.g., whether or not the client is a trusted client). After fetching the MPD, a client that determines it would not meet the content access authorization or trusted client authentication requirements can ignore the content (rather than downloading protected content and then recognizing that the client may be unable to decrypt the protected content since the client may not have the keys that are made accessible to trusted clients through content access authorization or trusted client authentication protocols). In the meantime, a client satisfying the content access authorization or trusted client authentication requirements can then initiate a corresponding content access authorization or trusted client authentication protocols to obtain the keys that are used in order to be able to decrypt and access the content.

The ContentAuthorization element can be extended in a separate namespace to provide information specific to the content access authorization scheme (e.g., particular key management systems or authentication methods). When multiple ContentAuthorization elements are present, each ContentAuthorization element can describe a content access authorization scheme or trusted client authentication scheme that is sufficient to access and present the Representation.

Figure 10:
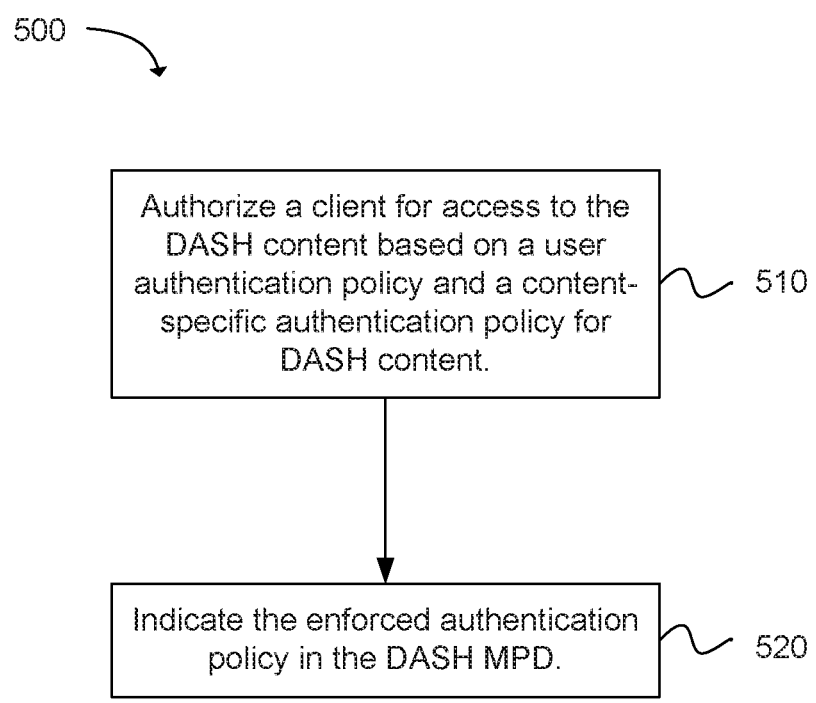
FIG. 10 depicts functionality of computer circuitry of a dynamic adaptive streaming over hypertext transfer protocol (HTTP) aware (DASH-aware) network application function (D-NAF) in accordance with an example.

Another example provides functionality 500 of computer circuitry of a dynamic adaptive streaming over hypertext transfer protocol (HTTP) aware (DASH-aware) network application function (D-NAF), as shown in the flow chart in FIG. 10. The functionality may be implemented as a method or the functionality may be executed as instructions on a machine, where the instructions are included on at least one computer readable medium or one non-transitory machine readable storage medium. The computer circuitry can be configured to authorize a client for access to the DASH content based on a user authentication policy and a content-specific authentication policy for DASH content, as in block 510. The computer circuitry can be further configured to indicate the enforced authentication policy in the DASH MPD, as in block 520.

In an example, the computer circuitry configured can be further: receive a user authentication policy for the client; and receive the content-specific authentication policy for DASH content from a content service provider. In another configuration, the computer circuitry configured to authorize the client for access to the DASH content can be further configured to: parse a DASH media presentation description (MPD) metadata file for DASH content information including content-specific authentication policy information; and update the MPD to include any network-based user authentication policies. Each component of the DASH content information can include an MPD period, an MPD adaption set, an MPD representation, an MPD segment, or an MPD sub-segment. The computer circuitry configured to authorize the client for access to the DASH content can be further configured to: receive DASH authentication information for DASH content information and a DASH content information address in the MPD metadata file; and authorize the client for access to DASH content based upon the received authentication policy. The DASH authentication information can include a received uniform resource locator (URL) signature and a URL authentication key, and the DASH content information address can include a DASH content information URL. The computer circuitry configured to authorize the client for access to the DASH content can be further configured to: calculate a URL signature based on the DASH content information URL and the authentication key; and reject the DASH content when the locally calculated URL signature does not match the received URL signature. The client can include a client device that includes a mobile terminal (MT), a user equipment (UE), or a mobile station (MS). The client device can include an antenna, a camera, a touch sensitive display screen, a speaker, a microphone, a graphics processor, an application processor, internal memory, or a non-volatile memory port.

Figure 11:
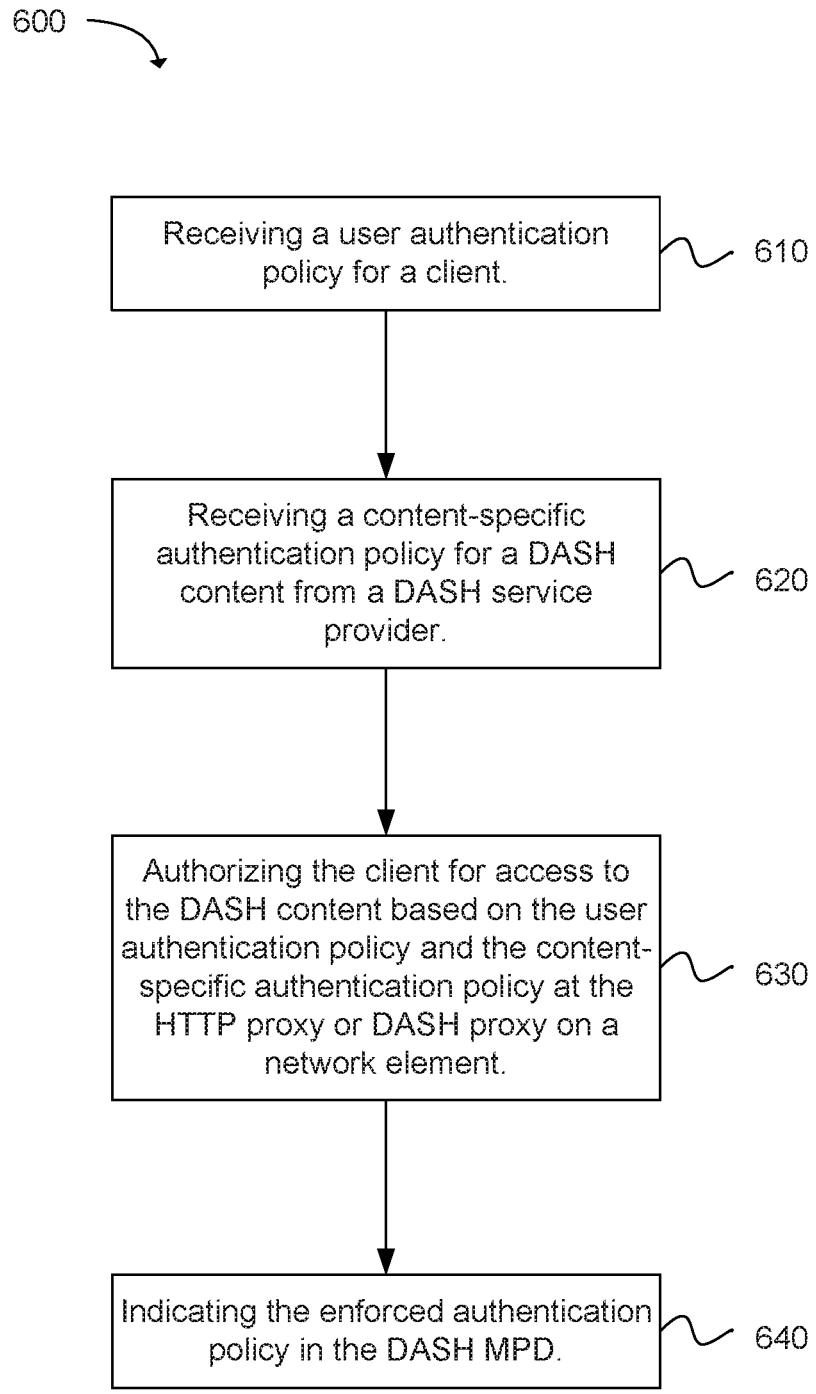
FIG. 11 depicts a flow chart of a method for providing content-specific authentication using a hypertext transfer protocol (HTTP) proxy or a dynamic adaptive streaming over HTTP (DASH) proxy in accordance with an example.

Another example provides a method 600 for providing content-specific authentication using a hypertext transfer protocol (HTTP) proxy or a dynamic adaptive streaming over HTTP (DASH) proxy, as shown in the flow chart in FIG. 11. The method may be executed as instructions on a machine or computer circuitry, where the instructions are included on at least one computer readable medium or one non-transitory machine readable storage medium. The method includes the operation of receiving a user authentication policy for a client, as in block 610. The operation of receiving a content-specific authentication policy for DASH content from a DASH service provider follows, as in block 620. The next operation of the method can be authorizing the client for access to the DASH content based on the user authentication policy and the content-specific authentication policy at the HTTP proxy or DASH proxy on a network element, as in block 630. The method can further include indicating the enforced authentication policy in the DASH MPD, as in block 640.

In an example, the operation of authorizing the client for access to the DASH content can further include: parsing a DASH media presentation description (MPD) metadata file for DASH content information, including content-specific authentication policy information; and updating the MPD to include any network-based user authentication policies. In another configuration, the operation of authorizing the client for access to the DASH content can further include authorizing each component of the DASH content information. Each component of the DASH content information can include an MPD period, an MPD adaption set, an MPD representation, an MPD segment, or an MPD sub-segment. In another example, the operation of authorizing the client for access to the DASH content can further include receiving DASH authentication information for DASH content and a DASH content information location in the MPD metadata file; and authorizing the client for access to DASH content based upon the received authentication policy. The DASH authentication information can include a received uniform resource locator (URL) signature and a URL authentication key. The DASH content information location can include a DASH content information URL. In another configuration, the operation of authorizing the client for access to the DASH content can further include: locally calculating a URL signature based on the DASH content information URL and the authentication key; and discarding the DASH content when the locally calculated URL signature does not match the received URL signature.

In another example, the operation of authorizing the client for access to the DASH content can further include retrieving a content key from a bootstrapping server function (BSF) including a NAF key material (Ks_NAF) for the DASH content information. In another configuration, the operation of authorizing the client for access to the DASH content can further include nullifying a user authentication based on a predetermined condition (e.g., an overload condition of the HSS). The user authentication can include a generic authentication architecture-based (GAA-based) authentication procedure via a bootstrapping server function (BSF) or home subscriber subsystem (HSS).

Referring back to FIG. 7, a dynamic adaptive streaming over hypertext transfer protocol (HTTP) aware (DASH-aware) network application function (D-NAF) on a server can include a network application function (NAF) 110 for authenticating a client, and a DASH proxy 114 for delivering DASH content and authentication information for the client. The DASH proxy can be further configured to: parse a DASH media presentation description (MPD) metadata file for DASH content information including content-specific authentication policy information; and update the MPD to include authentication policy information from the NAF. The D-NAF can be further configured to authorize the client for access to DASH content subject to content-specific authentication policies. The DASH content information can include a DASH content information uniform resource locator (URL). The DASH content information URL can be used to authenticate a base URL for a DASH MPD, period, adaption set, or representation level, or the DASH content information URL can be used to authenticate a segment URL of the MPD.

In another example, the NAF can be further configured to retrieve a session key from a bootstrapping server function (BSF) including a NAF key material (Ks_NAF), profile, boostrapping time, or key lifetime. The DASH proxy can be further configured to retrieve content keys for the DASH content information. In another configuration, the NAF or the DASH proxy can be further configured to retrieve a content key from a bootstrapping server function (BSF) including a NAF key material (Ks_NAF) for the DASH content information. In another example, the D-NAF can be further configured to: receive DASH-specific authentication policy from a DASH service provider for DASH content; and override a generic authentication architecture-based (GAA-based) authentication procedure via a bootstrapping server function (BSF) or home subscriber subsystem (HSS).

In another configuration, the DASH proxy or the NAF can be further configured to receive DASH-specific authentication policy from a DASH service provider DASH content; incorporate the DASH-specific authentication policy into a user authentication policy; authorize client access to the DASH content by enforcing both the DASH-specific authentication policy and the user authentication policy for the DASH content information and the client authentication; and indicate the enforced authentication policy in the DASH MPD. The D-NAF can provide operator network authentication for the DASH service provider. In another example, the D-NAF can receive the DASH service provider's authentication policy in the DASH MPD.

In another example, the DASH proxy can be further configured to: receive DASH authentication information for DASH content and a DASH content information location in a media presentation description (MPD) metadata file; authorize the client for access to DASH content based upon the received authentication policy; and indicate the enforced authentication policy in the DASH MPD. The DASH authentication information can include a signature and an authentication key, and the DASH content information location can include a DASH content information uniform resource locator (URL). The DASH proxy can be further configured to validate each component of the DASH content information. Each component of the DASH content information includes an MPD period, an MPD adaption set, an MPD representation, an MPD segment, or MPD sub-segment. In another configuration, the DASH proxy can be further configured to: calculate a URL signature based on the DASH content URL and the authentication key; and reject the DASH content when the locally calculated URL signature does not match the received signature. The D-NAF can be hosted on a network element.

Figure 12:
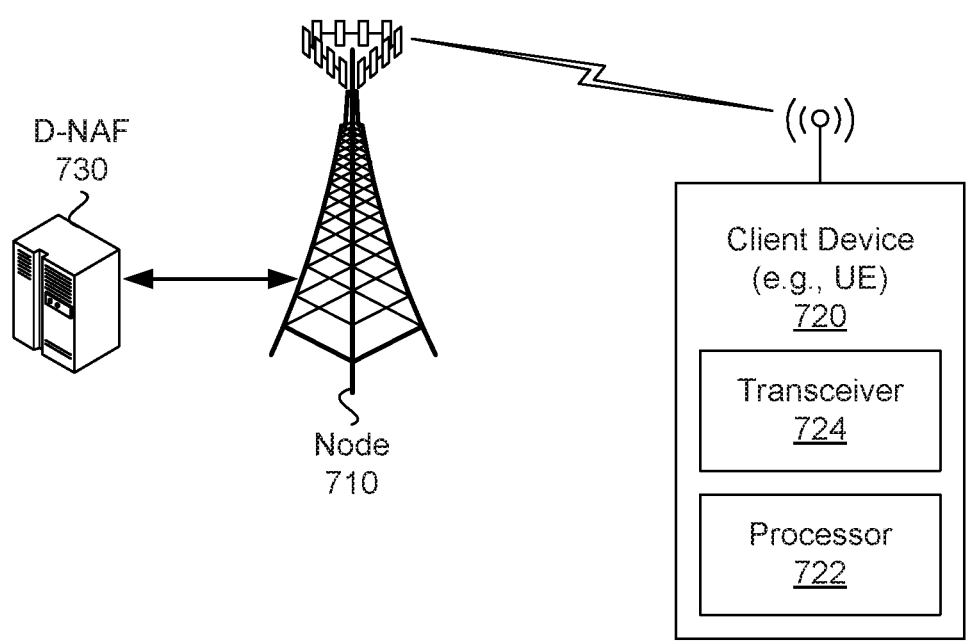
FIG. 12 illustrates a diagram of a dynamic adaptive streaming over hypertext transfer protocol (HTTP) aware (DASH-aware) network application function (D-NAF), a node (e.g., eNB), and a user equipment (UE) in accordance with an example.

FIG. 12 illustrates an example client device 720 for providing content authentication for DASH, a node 710, and dynamic adaptive streaming over hypertext transfer protocol (HTTP) aware (DASH-aware) network application function (D-NAF) on a server 730 for content authentication for DASH. The D-NAF can be configured to authenticate DASH content information, as described in 500 of FIG. 10. In another configuration, the D-NAF can provide content-specific authentication using a HTTP proxy or a DASH proxy, as described in 600 of FIG. 11. The client device 720 can include a processor 722 and a transceiver 724. In an example, the client device can communicate with the D-NAF via the node. The node 710 can include a base station (BS), a Node B (NB), an evolved Node B (eNB), a baseband unit (BBU), a remote radio head (RRH), a remote radio equipment (RRE), a remote radio unit (RRU), or a central processing module (CPM).

Figure 13:
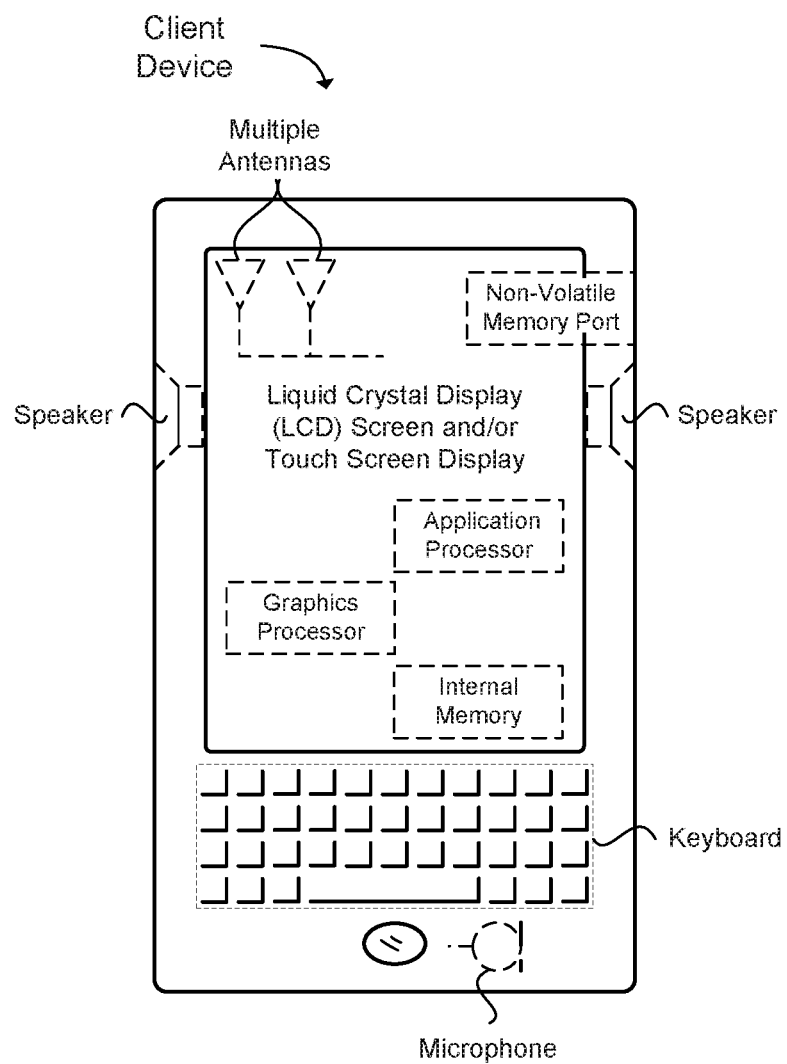
FIG. 13 illustrates a diagram of a wireless device (e.g., UE) in accordance with an example.

FIG. 13 provides an example illustration of the client device, such as a mobile terminal (MT), a mobile node, a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 13 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A server comprising a network application function (NAF), the server comprising one or more processors and memory configured to:
    authenticate a client using a Generic Bootstrapping Architecture (GBA)-based authentication and authorization procedure;
    authorize the client for access to dynamic adaptive streaming over hypertext transfer protocol (HTTP) (DASH) content subject to content-specific policy information using the GBA-based authentication and authorization procedure, wherein the content-specific policy information is for a specific bitrate or resolution of the DASH content;
    receive, using the NAF, DASH authentication information for the DASH content and a DASH content information location in a media presentation description (MPD), wherein the DASH authentication information includes a signature and an authentication key, and the DASH content information location includes a DASH content information uniform resource locator (URL);
    authorize, using the NAF, the client for access to the DASH content based upon the received DASH authentication information and the received DASH content information;
    deliver the DASH content to the client when the client is successfully authenticated and authorized using the GBA-based authentication and authorization procedure; and
    provide operator network authentication and authorization for a DASH service provider, wherein the NAF receives the content-specific policy information from the DASH service provider.

2. The server of claim 1, wherein the one or more processors and memory are further configured to parse, using the NAF, a DASH media presentation description (MPD) for DASH content information that includes the content-specific policy information.

3. The server of claim 1, wherein the one or more processors and memory are further configured to parse, using the NAF, a DASH media presentation description (MPD) for DASH content information that includes a DASH content information uniform resource locator (URL), wherein the DASH content information URL is used to authenticate a base URL for a DASH MPD, period, adaption set, or representation level, or the DASH content information URL is used to authenticate a segment URL of the MPD.

4. The server of claim 1, wherein the one or more processors and memory are further configured to:
    retrieve, using the NAF, a session key from a bootstrapping server function (BSF) including a NAF key material, profile, bootstrapping time, or key lifetime; or
    retrieve, using the NAF, a content key from the BSF including a NAF key material for DASH content information.

5. The server of claim 1, wherein the one or more processors and memory are further configured to override, using the NAF, the GAA-based authentication and authorization procedure via a bootstrapping server function (BSF) or a home subscriber subsystem (HSS).

6. The server of claim 1, wherein the one or more processors and memory are further configured to receive, using the NAF, an authentication and authorization policy of a DASH service provider in a DASH media presentation description (MPD).

7. The server of claim 1, wherein the one or more processors and memory are further configured to authorize, using the NAF, the client for access to the DASH content subject to a streaming plan associated with the client, wherein the streaming plan describes acceptable bitrates and resolutions for accessing the DASH content at the client.

8. The server of claim 1, wherein the one or more processors and memory are further configured to validate, using the NAF, an integrity of delivered DASH content to ensure a defined level of content delivery accuracy.

9. The server of claim 1, wherein the one or more processors and memory are further configured to validate, using the NAF, an integrity of a DASH media presentation description (MPD) for DASH content information.

10. The server of claim 1, wherein the one or more processors and memory are further configured to: calculate, using the NAF, a URL signature based on the DASH content URL and the authentication key; and reject, using the NAF, the DASH content when the calculated URL signature does not match the signature received in the DASH authentication information.

11. At least one non-transitory machine readable storage medium having instructions embodied thereon for authenticating and authorizing a client to receive dynamic adaptive streaming over hypertext transfer protocol (HTTP) (DASH) content, the instructions when executed by one or more processors of a server performs the following:

authenticating, at the server that includes a network application function (NAF), a client using a Generic Bootstrapping Architecture (GBA)-based authentication and authorization procedure;

authorizing, at the server that includes the NAF, the client for access to dynamic adaptive streaming over hypertext transfer protocol (HTTP) (DASH) content subject to content-specific policy information using the GBA-based authentication and authorization procedure, wherein the content-specific policy information is for a specific bitrate or resolution of the DASH content;

receive, using the NAF, DASH authentication information for the DASH content and a DASH content information location in a media presentation description (MPD), wherein the DASH authentication information includes a signature and an authentication key, and the DASH content information location includes a DASH content information uniform resource locator (URL);

authorize, using the NAF, the client for access to the DASH content based upon the received DASH authentication information and the received DASH content information;

delivering, from the server that includes the NAF, the DASH content to the client when the client is successfully authenticated and authorized using the GBA-based authentication and authorization procedure; and providing, from the server that includes the NAF, operator network authentication and authorization for a DASH service provider, wherein the NAF received the content-specific policy information from the DASH service provider.

12. The at least one non-transitory machine readable storage medium of claim 11, further comprising instructions when executed by the one or more processors performs the following: receiving an authentication and authorization policy of a DASH service provider in a DASH media presentation description (MPD).

13. The at least one non-transitory machine readable storage medium of claim 11, further comprising instructions when executed by the one or more processors performs the following: authorizing the client for access to the DASH content subject to a streaming plan associated with the client, wherein the streaming plan describes acceptable bitrates and resolutions for accessing the DASH content at the client.

14. The at least one non-transitory machine readable storage medium of claim 11, further comprising instructions when executed by the one or more processors performs the following: validating an integrity of delivered DASH content to ensure a defined level of content delivery accuracy.

15. The at least one non-transitory machine readable storage medium of claim 11, further comprising instructions when executed by the one or more processors performs the following: validating an integrity of a DASH media presentation description (MPD) for DASH content information.

16. A server that includes a network application function (NAF), the server comprising one or more processors and memory configured to:

authenticate, using the NAF, a client using a Generic Bootstrapping Architecture (GBA)-based authentication and authorization procedure;

authorize, using the NAF, the client for access to dynamic adaptive streaming over hypertext transfer protocol (HTTP) (DASH) content subject to content-specific policy information using the GBA-based authentication and authorization procedure, wherein the content-specific policy information is for a specific bitrate or resolution of the DASH content;

receive DASH authentication information for the DASH content and a DASH content information location in a media presentation description (MPD), wherein the DASH authentication information includes a signature and an authentication key, and the DASH content information location includes a DASH content information uniform resource locator (URL);

authorize, using the NAF, the client for access to the DASH content based upon the received DASH authentication information and the received DASH content information;

deliver the DASH content to the client when the client is successfully authenticated and authorized via the NAF using the GBA-based authentication and authorization procedure; and provide operator network authentication and authorization for a DASH service provider, wherein the NAF receives the content-specific policy information from the DASH service provider.

17. The server of claim 16, wherein the one or more processors and memory are further configured to parse, using the NAF, a DASH media presentation description (MPD) for DASH content information that includes the content-specific policy information.

18. The server of claim 16, wherein the one or more processors and memory are further configured to parse, using the NAF, a DASH media presentation description (MPD) for DASH content information that includes a DASH content information uniform resource locator (URL), wherein the DASH content information URL is used to authenticate a base URL for a DASH MPD, period, adaption set, or representation level, or the DASH content information URL is used to authenticate a segment URL of the MPD.

19. The server of claim 16, wherein the one or more processors and memory are further configured to:

retrieve, using the NAF, a session key from a bootstrapping server function (BSF) including a NAF key material, profile, bootstrapping time, or key lifetime; or retrieve, using the NAF, a content key from the BSF including a NAF key material for DASH content information.

20. The server of claim 16, wherein the one or more processors and memory are further configured to authorize, using the NAF, the client for access to the DASH content subject to a streaming plan associated with the client, wherein the streaming plan describes acceptable bitrates and resolutions for accessing the DASH content at the client.

21. The server of claim 16, wherein the one or more processors and memory are further configured to:
   validate, using the NAF, an integrity of delivered DASH content to ensure a defined level of content delivery accuracy; or
   validate, using the NAF, an integrity of a DASH media presentation description (MPD) for DASH content information.

* * * * *